United States Patent [19]

Mitsui et al.

[11] 4,029,550

[45] June 14, 1977

[54] PROCESS FOR THE DRY DISTALLATION OF RUBBER

[75] Inventors: Shigeo Mitsui, Ebetsu; Tomiyasu Araki, Sapporo; Kazuhiko Niikawa, Sapporo; Hideo Hosoda, Sapporo; Yoshio Jyo; Ryuichiro Yoda, both of Yokohama; Giichi Suzuki, Kudamatsu; Takasi Iijima, Yokohama; Hiroshi Tanaka, Yokohama; Yasutaka Ochiai, Yokohama; Takashi Ise, Yokohama, all of Japan

[73] Assignees: Agency of Industrial Science & Technology; Nippon Zeon Co., Ltd.; Japan Gasoline Co., Ltd., all of Tokyo, Japan

[22] Filed: Jan. 2, 1974

[21] Appl. No.: 429,980

[30] Foreign Application Priority Data

Jan. 5, 1973 Japan ............................ 48-2942

[52] U.S. Cl. .................................. 201/2.5; 201/25; 201/31; 201/36

[51] Int. Cl.² ....................................... C10B 57/04

[58] Field of Search ................ 201/2.5, 25, 31, 36, 201/37; 48/209

[56] References Cited

UNITED STATES PATENTS

| 3,582,279 | 6/1971 | Beckman et al. | 201/25 X |
|---|---|---|---|
| 3,736,111 | 5/1973 | Gardner et al. | 48/209 X |
| 3,843,339 | 10/1974 | Saito | 201/2.5 X |

Primary Examiner—Morris O. Wolk
Assistant Examiner—Arnold Turk
Attorney, Agent, or Firm—Frank J. Jordan

[57] ABSTRACT

A process for the dry distillation of used rubber in a fluidized bed-forming oven comprises heating used rubber under agitation in the presence of solid particles to temperatures sufficient to make the rubber pulverized and further heating the thus-obtained rubber particles to temperatures sufficient to pyrolyze the rubber particles while forming a fluidized bed thereof and burning a part thereof in the stream of an oxygen-containing fluidizing gas.

16 Claims, 3 Drawing Figures

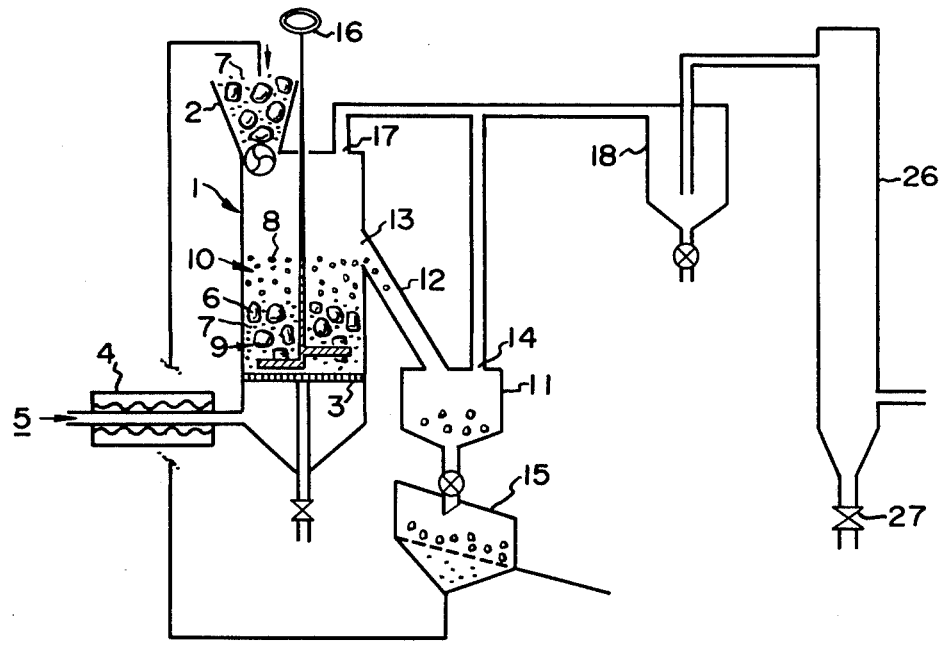
FIG. I
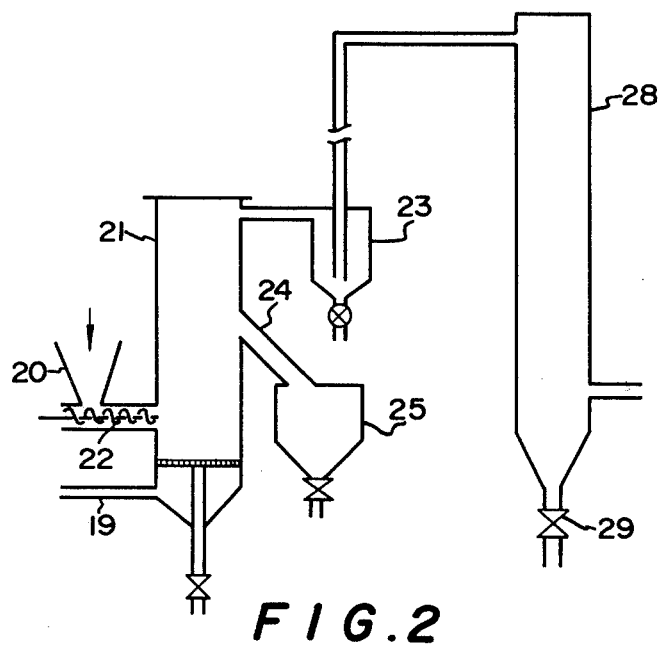
FIG. 2

PROCESS FOR THE DRY DISTALLATION OF RUBBER

BACKGROUND OF THE INVENTION

This invention relates to a process for the dry distillation of rubber blocks, obtained from used tires, rubber scrap and the like which are industrial waste materials, in a heating oven such as a fluidized bed-forming oven. More particularly it relates to a process for dry distilling such rubber blocks by heating the blocks for the pulverization thereof and then heating the pulverized blocks for the pyrolysis thereof in such a heating oven or by heating the blocks for the substantially simultaneous pulverization and pyrolysis thereof in the heating oven.

With the recent remarkable progress of industry and economy, the amount of rubber articles demanded has rapidly increased with the result that large quantities of used rubber articles and rubber scrap accompanied with the preparation of rubber articles have been produced as industrial waste or refuse. Thus, various studies have been made in an attempt to find new uses of such large quantities of rubber waste in addition to conventional uses thereof.

The primary object of this invention is to provide a new process for dry distilling the rubber waste to convert the same to oily materials and residues which are both useful materials, in contrast to conventional processes for disposing of such rubber waste by burning.

This object is achieved by mixing a powdery or granular thermal medium with the rubber waste in block form such as used tires, rubber scrap, synthetic rubber rejects from synthetic rubber processing steps, and the like which should be rejected; heating the resulting mixture to 250°–400° C under agitation to make the rubber blocks brittle and to pulverize them and further heating the thus-obtained rubber powder to 400°–500° C while floating and flowing the powder in a stream of air or any other oxygen-containing gas, that is, forming a fluidized bed of the powder, to thermally decompose the powder into oily and solid components which are then separately recovered with a high yield.

The aforementioned object is also achieved by heating the rubber blocks to 350°–800° C under agitation while producing carbon powder as a dry distillation residue that serves as a powdery thermal medium to pulverize the rubber blocks into rubber powder and substantially simultaneously pyrolyze the powder while floating and fluidizing the powder in an oxygen-containing gas stream and burning part of the powder to supply the necessary heat to the system, thereby obtaining oily materials and solid residues (carbonized materials).

In pulverizing blocks of used rubber, a mechanical pulverizing method has heretofore been employed. To practice the method, however, requires a very secure apparatus, and the apparatus needs the removal of metallic scrap, such as iron scraps, possibly present in the rubber blocks before the apparatus is used. Such apparatuses are very noisy during their operation and they are also disadvantageous in that they cannot pulverize all of the rubber varying from hard vulcanized rubber such as tires to very soft unvulcanized ones.

In contrast, according to this invention, the rubber blocks are pulverized by chemical and physical actions caused therein by heating, and the blocks so pulverized is pyrolyzed subsequent to, or substantially simultaneously with, the pulverization under approximately the same operational conditions as the pulverization, thereby allowing said two treatments to be effected substantially one after another or substantially simultaneously with each other in the same apparatus.

When the rubber blocks are heated to high temperatures, (1) the molecules in the outer layer of the rubber blocks are cross-linked with each other through the double bonds present in the blocks or radicals produced by the severance of the molecules, the liberation of the side chain groups, or the like. When such cross-linking proceeds, the outer layer of the rubber blocks will be in a suitably hardened state as in thermoset plastics and will, in certain cases, come to crack while the inner layer thereof will be in a molten state. The rubber blocks in such state tend to cause chipping at the partial portions of the outer layer thereof and further cause peeling of the outer layer from the inner layer by applying a relatively small stress to the blocks. Thus, when the rubber blocks are in said state under agitation, they will cause gradual peeling of their outer layer therefrom by the force of collision and friction between the rubber blocks themselves, between the blocks and the agitator, and between the blocks and said solid particles. The agitator may stop its rotation for several seconds due to a heavy load just after the charge of the rubber blocks, after which it restarts its rotation. In addition to such phenomena as mentioned above, (2) the rubber blocks in said state not only melt but also cause decomposition and polymerization of the molecules in the melted inner layer thereof to produce therein gaseous low-molecular compounds (hereinafter sometimes referred to simply as "volatile components") having a gas pressure by which the blocks are ruptured and disintegrated, the rupture and disintegration starting at the inner layer. At this time the outer layer is finely divided or separated from the inner layer in such a manner that it flies off in pieces. The rubber blocks are thus pulverized.

In the outer layer of the rubber blocks when initially exposed to high temperatures and the inner layer exposed after the peeling-off of the outer layer as in the case (1) mentioned above and in the inner layer exposed after the disintegration of the blocks or the peeling-off of the outer layer as shown in the case (2), the rubber portions of the blocks are melted and viscous and they therefore adhere to each other or to the apparatus in which the blocks are treated. Such adhesion of the rubber portions when heated, can be prevented by mixing them with, for example, gravel, glass baloons, i.e., hollow glass globules, rubble, powdered carbon, powdered iron, carbonized rubber or carbonized synthetic resins, coke, magnetite, terra alba or any other solid particles capable of preventing the melt adhesion of rubber when heated (these solid particles being hereinafter sometimes referred to simply as "melt adhesion-preventing solid particles"). It is a matter of course that these particles may also serve as thermal media.

As is clear from the above description of the pulverization of the rubber blocks, the expression used herein that "the rubber blocks are made brittle according to this invention" is intended to mean that the rubber blocks are made brittle by heat treatment to the extent that they can be pulverized as indicated in the cases (1) and (2).

According to this invention, as previously mentioned, in obtaining the powdered rubber easily from the rubber blocks, advantage is taken not only of the chemical actions such as the inter-molecular crosslinking reaction of the rubber blocks as well as the decomposition and polymerization thereof but also of the physical actions such as the friction and shock produced by the relatively small stress as well as the gas pressure exerted by the volatile components produced by the decomposition and polymerization of the rubber blocks.

The ovens which may be used in the pulverization of the rubber blocks according to this invention include fixed bed-forming ovens, fluidized bed-forming ovens and any other suitable ovens, and the agitating devices which may be used herein include vane-type stirrers, gas stream-agitating devices and any other suitable devices. For this agitation purpose, rotary ovens may also be used. It would be possible for those skilled in the art to select a suitable one of said ovens or devices depending on the purpose for which it is used. The powdered rubber obtained may be recovered by filtration, separation based on difference in specific gravity, or the like.

In the step of pulverizing the rubber blocks according to this invention, they are usually heated to temperature in the range of 300°–390° C. These temperatures vary depending on such factors as the kind and properties of rubber blocks used and the desired particle size of powdered rubber to be obtained; however, a suitable temperature to be used may easily be selected from those in said range by making preliminary tests for determining the suitable temperature. For example, a temperature of 250° C is a satisfactory one at which the powdered rubber can be obtained in cases where an oxygen-rich gas is used in the system. However, there should be avoided the use of high temperatures at which the powdered rubber is violently pyrolyzed. The particle size of powdered rubber to be obtained may be controlled or adjusted by the selection of pulverizing conditions such as heating temperature, heating time, agitation stress, the kind, size and amount of melt adhesion-preventing solid particles and the amount of gas introduced to a fluidized bed-forming oven which is the most preferable one for pulverization of the rubber blocks. In addition, the volatile components produced by heating the rubber blocks as previously mentioned are combustible and they can be used as an effective heat source by burning them. The combustion gas produced by said burning may be employed as gaseous streams in the dry distillation, that is, pulverization and pyrolysis in the fluidized bed-forming oven according to this invention.

The rubber powder so produced is subjected to main dry distillation while causing it to be floated and fluidized in the oven. There have heretofore been proposed several methods for pyrolyzing rubber material such as used tires, and these methods are each a pyrolyzing method using a closed, fixed bed-forming oven. The practice of these methods will raise such problems that rubber material is difficult to feed continuously, the temperature of the rubber material is difficult to adjust because of a temperature gradient being produced between the inner and outer portions of the rubber material, and the time for the decomposition reaction is long.

On the other hand, the employment of a method for oxidation fluidized bed dry distillation (that is, fluidized bed dry distillation in the stream of an oxygen-containing gas) according to this invention, will be advantageous in that rubber material is allowed to be continuously fed, a fluidized bed is formed of rubber powder having a particle size of not larger than 5 mm, a temperature control is very easy since the rubber powder is mixed with a thermal medium, and a decomposition reaction is completed in a very short time since the fluidized bed formed by the oxygen-containing gas is partially burnt thereby to give heat to the system. In the fluidized bed pyrolysis according to this invention, the temperature control is important since it has an effect on the yield of oily components and carbonized components which are products obtained by the pyrolysis. The rubber material when heated, will decompose with some exothermic heat evolved therefrom, and the temperature control of the system can be made easy by controlling the amount of the exothermic heat evolved. More particularly, the temperature in the oven may be controlled or adjusted very precisely, for instance, by controlling the amount of rubber material fed while selectively using air only or in inert gas-diluted air, that is, adjusting the content of oxygen thereof introduced to form the fluidized bed. The process of this invention is economically advantageous in that it needs enough externally supplied heat to commence the decomposing reaction, after which it can maintain the decomposing reaction without such externally supplied heat since the heat necessary for said reaction is obtained by the combustion of part of the rubber material fed. The inside of the oven for fluidized bed pyrolysis is kept at temperatures of, preferably, 400°–500° C.

In the practice of the process of this invention, it is important to adjust the temperature for dry distilling the pulverized rubber to a certain fixed temperature within the range of from 400° to 500° C in order to recover oily materials, particularly dipentenes, in a high yield.

The fluidized bed pyrolyzing oven which may be used in the practice of this invention is preferably provided with an agitator depending upon the shape of rubber material used. Such an agitator-provided oven is preferably used particularly when rubber powder produced is relatively large in particle size or is partially not uniform in particle size.

In practicing fluidized bed pyrolysis, the thermal media are not necessarily needed in cases where the rubber particles produced are in the finely divided form or are uniform in shape or particle size. Particularly when tire scrap is used as the starting material in the process of this invention, the carbon black incorporated in the scrap will be liberated therefrom and thereby function as a very suitable thermal medium for the fluidized bed. Carbon particles produced by the carbonization of the rubber material also function as a thermal medium. If thermal media are needed in the pyrolyzing step, they may be the same as used in the step of pulverizing the rubber blocks. When the rubber material is continuously fed to the fluidized bed-forming oven which is continuously operated, solid carbonized materials from the rubber materials will be acumulated as the pyrolysis and carbonization thereof proceed in the oven. Thus the carbonized materials so produced are allowed to overflow through an overflow pipe leading from the middle part of the oven, for their separation from the system. Even in cases where the thermal medium is used as mentioned above, a small amount of the thermal medium for the fluidized bed needs to be supplied from an external source of the thermal medium only at the beginning of operation of the oven, after which the system is self-supplied with such thermal medium produced as a by-product by the pyrolysis of the rubber material fed. From the viewpoint of effective use of solid carbonized materials produced by pyrolyzing rubber material, it is desirable that residual carbonized materials, carbon black and/or the like previously obtained pyrolysis be employed as such thermal medium being initially used as mentioned above.

The oxygen-containing gases which may be used in the fluidized bed-forming oven are not particularly limited, and include air and the mixtures thereof with an inert gas such as nitrogen, steam or carbonic acid gas or with a combustion gas. These gases may also be utilized as a heat source. The rubber materials which may be used herein are not particularly limited, and examples thereof are the vulcanizates and unvulcanizates of natural rubber and various synthetic rubbers.

In one aspect of this invention, in a single fluidized bed type heating oven, the rubber blocks are mixed with the melt adhesion-preventing solid particles, subjected to pulverization at 250°–400° C to produce therefrom rubber powder sufficiently fine to form a fluidized bed thereof and then raised in temperature at 400°–500° C while being kept in the form of fluidized bed, thereby to effect the thermal oxidation and pyrolysis of the rubber powder in the bed. In this case, the process of this invention comprises two steps of pulverization and pyrolysis, which steps are alternately repeated in the single oven. If there is used a two-oven system comprising an oven for the pulverization and an oven for the pyrolysis connected to each other in series, the two steps may be effected continuously. In this two-oven system, rubber powder approximately uniform in particle size produced in the pulverizing oven may be passed or supplied to the pyrolyzing oven either at the bottom thereof through a screw conveyor or at the top thereof through a hopper or the like. The method of supply in this case is determined depending on the kind and shape of rubber supplied.

It is to be understood that in the step of pulverization the pulverization of rubber blocks is principally effected while the pyrolysis thereof is simultaneously accessorily effected, and that in the step of pyrolysis the pyrolysis, of the rubber blocks so pulverized is principally effected while slightly additional pulverization is simultaneously accessorily affected. Thus it is to be also understood that the dry distillation of the rubber material is effected slightly in the step of pulverization and vigorously in the step of pyrolysis.

The oily materials obtained by the dry distillation of the rubber blocks are passed from the oven at the top thereof to a cooler through a cyclone. Since the oven according to this invention is capable of forming a fluidized bed therein and adjusting the temperature of the bed precisely by controllably varying the amount of rubber powder burnt, it is possible according to the process of this invention to produce oily materials in a substantially constant composition in an increased yield. Since the oily materials greatly depend for their yield on the cooling efficiency of a cooling device used, the device should be such that the oily materials are recovered in a high yield. For example, the oily materials are passed through an oil layer to effect a heat exchange therebetween thereby increasing the yield of the former. More particularly, the oily materials in a gaseous state is firstly cooled by the air into a condensate which is further cooled by water and then passed through the oil layer thereby completing the cooling thereof.

In the above-mentioned manner, the oily materials and the solid carbonized materials can be recovered in a total yield of about 95% based on the weight of the powdered rubber used. The remaining approximately 5%, which comprises mainly lower hydrocarbons such as methane and ethane, is dissipated or lost; if collected, however, it can be used as a gasious fuel.

The oily materials and the carbonized materials are recovered in a total yield of about 90% based on the weight of the rubber blocks used.

In another aspect of this invention, in a single fluidized bed-forming oven provided with an agitator, used rubber materials such as used tires, are heated to 350°–800° C, preferably 400°–600° C, under agitation while producing carbon particles as a dry distillation residue by dry distilling said rubber materials, the carbon particles serving as a powdery thermal medium, to pulverize the rubber material and substantially simultaneously pyrolyze the thus-obtained rubber powder while forming a fluidized bed thereof in the stream of an oxygen-containing gas and burning part of the rubber materials. If the used rubber materials are exposed to temperatures such as 350°–450° C, they will be pulverized by collision and friction caused between the rubber materials and the vanes of the agitator, between the rubber materials themselves and between the rubber materials and the carbon particles as the dry distillation residue, thereby enabling the rubber materials to be dry distilled while being fluidized irrespective of their initial shape. This can be confirmed by a hammer test as follows. A glass cylinder is charged with some amount of sand and heated air is introduced thereinto at the lower end thereof in order to form a fluidized bed of the sand. In the thus-formed fluidized bed kept at 350°–450° C, wire-supported tire scraps are inserted for 10–60 minutes, after which the scraps are withdrawn from the cylinder and subjected to the hammer test with the result that the scraps are pulverized extremely easily by hammering slightly. In this aspect of this invention, the carbon produced as a by-product by dry distilling and decomposing the rubber materials as the feed in the system is used as the melt adhesion-preventing agent and, therefore, no such agent is required to be added to the system from outside the system. The preventing agent, however, may of course be incorporated with a thermal medium such as sand for use as such. When the process is continued for a long time such carbon will be accumulated in the oven; however, an excess thereof may overflow outside the system through an overflow pipe as previously mentioned. In view of the fact that the slices of unvulcanized rubber when dry distilled, will not form a fluidized bed thereof even under agitation without the use of melt adhesion-preventing agent such as sand, the above embodiment of this invention will be understood to be useful even in the treatment of such unvulcanized rubber. Also in this embodiment, the burning of the part of the fluidized bed serves to allow the decomposing or pyrolyzing reaction to proceed very rapidly, facilitates the control of temperature of the bed and enhances the yield of the oily decomposition products. For example, when dry distilling used rubber tires at 450° C they will give oily products in a yield of not less than about 50% by weight thereof. The decomposition products vary in composition with the decomposing temperature used. The decomposition products obtained by the dry distillation at 450° C, when fractionally distilled, will be found to contain fractions of 150°–190° C and 360°–479° C in large amounts, that is, 70–80% by weight of the total of the oily products obtained. It is to be also noted that the oily products obtained are relatively uniform in composition. In contrast, the use of heated nitrogen or other inert gases supplied from outside the system as a heat source will make it difficult to secure a uniform temperature distribution in the fluidized bed and will result in a decreased yield and non-uniform composition of the oily products. The amount of heat obtained by burning part of the bed can be controlled and the temperature within the oven can therefore be precisely controlled by adjusting the amount of the used rubber tires fed while adjusting the amount of oxygen supplied by using air or an inert gas-diluted air as the gas for the formation of the fluidized bed. It is very advantageous from an economical point of view that the process requires the necessary heat from outside the system only at the initial stage of operation thereof and, after the start of decomposing reaction, it is self-supplied with the necessary heat by burning a portion of the rubber tire feed sufficient to supply said necessary heat to the system.

BRIEF DESCRIPTION OF THE DRAWINGS

FIG. 1 is a diagrammatic view illustrating the pulverization of used rubber material in the presence of externally supplied solid particles in a fluidized bed-forming oven according to this invention, FIG. 2 is a diagrammatic view illustrating the main dry distillation (pyrolysis) of the used rubber material in a fluidized bed-forming oven connected in series to the oven of FIG. 1.

DESCRIPTION OF THE PREFERRED EMBODIMENTS

Figure 3:
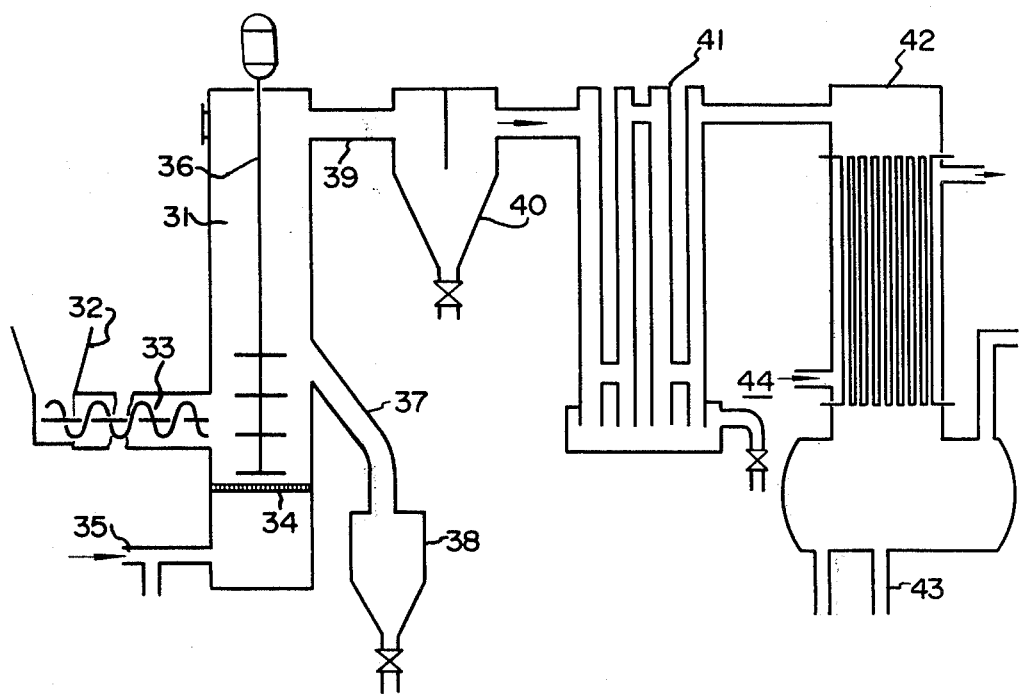
FIG. 3 is a diagrammatic view illustrating a dry distillation including substantially simultaneous pulverization and pyrolysis of used rubber material in the pressure of carbon particles produced therefrom in a fluidized bed-forming oven according to this invention.

Referring now to FIG. 1, a fluidized bed-forming oven 1 for pulverization, provided with a perforated tray 3 at the lower part thereof, an agitator 16 and a suitable heating means, is charged with used rubber 6 in block form and melt adhesion-preventing solid particles 7. A fluidizing gas 5 heated by a preheating oven 4 is introduced thereinto at the lower part thereof thereby agitating a mixture of said rubber blocks 6 and solid particles 7 to pulverize the rubber blocks 6. The rubber particles 8 so obtained are allowed to form a fluidized bed 10 thereof above a layer 9 of non-pulverized rubber blocks by adjusting the amount of the gas 5 introduced and then are withdrawn into a rubber particle receptacle 11 through an overflow conduit 12 connecting the fluidized bed 10 to the receptacle 11. The numeral 13 indicates the inlet opening of the conduit 12. Even if, in this case, the system comprising the receptacle 11 and conduit 12 is a closed one, the floating rubber particles in the bed 10 are fluidized in the longitudinal, lateral and any other directions with respect to the longitudinal axis of the oven 1, whereby they move through the inlet opening 13 and fall into the receptacle 11. The receptacle 11 may be provided with an outlet opening 14 for discharging gas at a moderate flow rate to facilitate the movement of the rubber particles 8 from the fluidized bed 10 to the receptacle 11 thereby accelerating the recovery of the particles 8. The rubber particles 8 collected in the receptacle 11 are filtered with a suitable sieve 15 to separate therefrom the melt adhesion-preventing solid particles 7 entrained thereby. On the other hand, the whole or the greater part of the fluidizing gas 5 passes through the outlet opening 17 at the top of the oven 1 to a cyclone 18 wherein are collected fine rubber particles entrained by the gas 5.

With particular reference to FIG. 2, the rubber particles collected in the receptacle 11 are transferred to a hopper 20 from which they are conveyed to a fluidized bed-forming oven 21 for pyrolysis at a fixed feed rate by a screw feeder 22. Carbonized materials produced simultaneously with the production of gaseous and oily products by the pyrolysis in oven 21 are partially passed, by being entrained by the latter, to a cyclone 23 wherein they are separated. The greater part of the carbonized materials are withdrawn through an overflow conduit 24 communicating with the oven 21, into a receptacle 25 for dry distillation residues. The cyclone 23 is maintained at the same temperature as the oven 21 to prevent the gaseous products obtained by the pyrolysis from condensing therein. The gaseous and oily products are then passed to a cooler 28 where they are cooled by heat exchange to obtain an effective amount of heat therefrom, and the oily products so obtained are then withdrawn through a valve 29.

Referring to FIG. 3, the blocks of used rubber tire are fed by a screw feeder 33, from a hopper 32 provided at the lower or upper part of the oven 31 to a fluidized bed-forming oven 31 provided with an agitator 36, a perforated tray 34 at the lower part thereof and a suitable heating device while air is introduced through a gas inlet opening 35 into the oven 31, thereby to dry distill (pulverize and pyrolyze) the rubber tire blocks while forming a fluidized bed thereof. Carbonized materials produced simultaneously with gaseous and oily products by the dry distillation, are partly entrained by these products and the air introduced as the fluidizing gas passes from an upper outlet opening 39 to a cyclone 40 where the carbonized materials so entrained are separated. The remaining greater part of the carbonized materials is withdrawn via an overflow conduit 37 fitted to the middle part of the oven 31 at its upper open end, into a receptacle 38 for dry distillation residues. The cyclone 40 is maintained at the same temperature as the oven 31 to prevent the gaseous decomposed components from condensing therein. The effluent from the oven 31 is then passed through a cooler 41 and a heat exchanger 42 to recover the effective heat therefrom, and the oily products so obtained are withdrawn from a receptacle at the bottom 43. The numeral 44 indicates an inlet opening for a coolant such as air or water.

This invention will be better understood by the following Examples.

EXAMPLE 1

There was used an apparatus including fluidized bed-forming heating oven as generally indicated in FIG. 1. This apparatus was constructed and operated as follows. A fluidized bed-forming oven 1 (inner diameter, 15 cm; height, 110 cm) was provided with a perforated tray 3 at the lower part thereof, an overflow conduit 12 fitted to the oven 1 at its upper open end 13 located above the perforated tray by 30 cm and a discharge conduit fitted to the oven 1 at its open end (outlet opening 17). A fluidizing gas 5 was introduced to the oven 1 at the lower part thereof to form a fluidized bed of rubber feed for the pulverization and carbonization thereof. The pulverized and carbonized portions of the rubber feed overflowed through the overflow pipe 12. The oily materials produced by the pulverization and carbonization were passed through a cyclone 18 where the carbonized materials entrained by the oily materials were separated therefrom, to a cooler 26 where they were condensed and recovered. The conduit connecting the oven 1 to the cooler 26 was kept warm to prevent the condensable products from condensing. From a manually rotatable hopper 2 provided at the top of the oven, the rubber material was manually fed to the oven so adjustably that the temperature in the oven was kept constant. Thus, a continuous operation of the apparatus was tried while keeping the temperature within the oven constant by adjusting the feed rate of the rubber material. The perforated tray used has perforations of 2 mm in diameter and a perforation ratio of 1.3%. The fluidizing gas used was air. The oven was provided with an agitator, and the agitator was operated at 20 r.p.m. to effect agitation. The experimental conditions were as indicated below.

| | |
|---|---|
| Gas velocity in oven (Feed rate of fluidizing gas) | 10 cm/sec |
| Thermal medium | Sand, 600 g |
| Rubber material | Tire cuts, Natural rubber Size and weight of each cut; 70 × 61 × 18 mm, 90.8 g |

The fluidized bed-forming oven 1 was externally heated to 420° C and then charged with about 220 g of the rubber material (a first charge). At this time the temperature within the oven was lowered to 360° C and, after a while, it started to rise and returned back to 420° C. When another 200 g of the rubber material was fed to the oven from the hopper 2 (a second charge) the temperature within the oven was again lowered to 360° C, after which it again started to rise and reached 420° C.

Subsequently, such feeding of the rubber material and variation in the temperature within the oven were repeated thereby allowing the pulverization of rubber material and the pyrolysis thereof to proceed alternately in the oven. This is particularized in Table 1.

Table 1

| No. of repetition of pulverization and pyrolysis | Amount of rubber material fed (g) | Initial temp. (° C) | Pulverization time (min.) | Final temp. (° C) | Pyrolysis time (min.) |
|---|---|---|---|---|---|
| 1 | 200 | 360 | 2 | 420 | 2 |
| 2 | 200 | 360 | 3 | 420 | 2 |
| 3 | 300 | 350 | 3 | 420 | 3 |
| 4 | 200 | 360 | 3 | 420 | 3 |

The agitator was stopped for a short time whenever the rubber material had been fed and, several second later, it was restarted in each case. In such manner as above the feeding of rubber material was repeated 25 times and the pulverization and pyrolysis were likewise repeated accordingly, during with a total of 6 kg of the rubber material were subjected to the treatment as mentioned above. The time required for said treatment was 120 minutes.

The carbonized materials so obtained were about 2,100 g and the oily materials thus obtained were approximately 3 kg. The carbonized materials, oily materials and gaseous materials so obtained were respectively in amounts of 35, 50 and 15% by weight of the rubber material fed.

EXAMPLE 2

In this Example, experiments were made using the same apparatus that has been used in Example 1 and using the same fluidizing gas and thermal medium as used in Example 1. Rubber blocks to be fed were prepared by cutting natural rubber-made automobile rubber tires into cubes having a size of 3 × 3 × 2 cm and an average weight of approximately 18 g. Twelve of the rubber blocks so prepared were fed into the oven from the upper hopper every time feeding was effected.

The oven was externally heated to 360° C, a first charge (216 g) of the rubber blocks thereinto was completed and the temperature in the oven reached 420° C (at this time, the pulverization was completed and the pyrolysis started), soon after which the operation of the apparatus was stopped, the rubber particles present in the oven were withdrawn therefrom and these particles were tested for weight and particle size (mesh). In addition, the oily materials recovered from the cooler 26 and the carbonized materials recovered from the pulverized rubber receptacle 11 were tested for weight, respectively. The results (of Experiment 1) were as indicated below.

| Mesh | −4 | 4 − 8 | 8 − 10 | 10 − 30 | 30 − |
|---|---|---|---|---|---|
| Weight % | 26 | 13.8 | 15.5 | 56.0 | 12.1 |
| Oily materials recovered: | | | | | 0 g |
| Carbonized materials recovered: | | | | | 3 g |

In another Experiment, when a first charge (210 g) of the rubber blocks fed into the oven was completed, the temperature within the oven was raised from 360° to 420° C and kept at this level for about 2 minutes, and the temperature within the oven began to drop (at this time, the pulverization and pyrolysis of the first charge of the rubber blocks were completed), the operation of the apparatus was stopped, and the pulverized rubber blocks, oily materials and carbonized materials were recovered and tested for their weight in the same manner as above (Experiment 2). The results are indicated in Table 2.

In Experiment 3, the same procedure as in Experiment 1 was followed except that the oven was charged twice with the rubber blocks and the temperature within the oven was raised to 420° C and, at this point, the operation of the apparatus was stopped; in Experiment 4, the procedure of Experiment 3 was followed except that the operation of the apparatus was stopped after the temperature within the oven had been kept at 420° C for 2 minutes. In Experiment 5, the procedure of Experiment 1 was followed except that the oven was charged four times with the rubber blocks, the temperature within the oven was raised to 420° C and, at this point, the operation of the apparatus was stopped; in Experiment 6, the procedure of Experiment 5 was followed except that the operation of the apparatus was stopped after the temperature within the oven had been maintained at 420° C for 2 minutes. In each of Experiments 3 to 6, the pulverized rubber blocks, oily products and carbonized products were recovered and then tested for their weight with the results being shown in Table 2 wherein the results of Experiment 1 are also shown. In these Experiments, the gaseous and volatile materials produced by the dry distillation of the rubber blocks fed, were not tested for their weight.

Table 2

| Experiment No. (Frequency of charge) | Amount of rubber blocks charged (g) | Pulverized rubber and decomposition products | | | |
|---|---|---|---|---|---|
| | | Pulverized rubber (g) | Oily products (g) | Carbonized products (g) | Recovery ratio of decomposition products (%) |
| 1 (1) | 216 | 202 | 0 | 3 | 1.4 |
| 2 (1) | 210 | 0 | 112 | 75 | 90.0 |
| 3 (2) | 432 (213+219) | 204 | 121 | 80 | 46.5 |
| 4 (2) | 434 (220+214) | 3 | 230 | 140 | 85.4 |
| 5 (4) | 864 (209+214+216+215) | 200 | 360 | 200 | 65.0 |
| 6 (4) | 860 (205+217+215+223) | 10 | 450 | 305 | 87.8 |

The pulverized rubber blocks, that is, rubber particles withdrawn from the oven in Experiment 5 were tested for particle size with the result being shown below. From the result it was found that the rubber blocks charged were pulverized as in Experiment 1.

| Particle size of the pulverized rubber (Experiment 5) | | | | | |
|---|---|---|---|---|---|
| Mesh | − 4 | 4 − 18 | 8 − 10 | 10 − 30 | 30 − |
| Wt. % | 1.4 | 7.5 | 10.3 | 61.1 | 18.7 |

EXAMPLE 3

The same fluidized bed-forming oven 1 that had been used in Example 1 was connected via an overflow pipe 12 thereof to a fluidized bed-forming oven 21 having the same construction as the oven 1. The same rubber blocks as used in Example 1 were heated and pulverized in the oven 1, and the rubber particles so obtained were subjected to pyrolysis while forming a fluidized bed thereof. The oily materials produced in the ovens 1 and 21 were cooled in coolers 26 and 28 and withdrawn therefrom, respectively. As in Example 1, feeding of about 200 g of the rubber blocks (prepared by cutting a used, natural rubber-made tire) into the oven was repeated 25 times at an interval of about 2–3 minutes, the total of the feeds amounting to about 5 Kg.

The operation of the oven 1 was the same as in Example 1 except that the oven 1 was externally heated to 360° ± 3° C at the initial stage of operation and nitrogen gas was used as the fluidizing gas. The oven 21 was externally heated to 420° ± 4° C at the initial stage of operation, after which the temperature of the oven 21 was adjusted by adjusting the amount of air used as the fluidizing gas. One minute after the oven 21 had begun to decrease in temperature after the last feeding of the rubber blocks into the oven 1, the operation of these ovens was stopped. The pulverized rubber, oily and carbonized materials collected or recovered from the predetermined locations as indicated in the following Table 3 were tested for their weight with the results being shown in said Table.

Table 3

| Pulverized rubber, and Products by dry distillation | Amount recovered (g) | Recovery ratio (%) |
|---|---|---|
| Pulverized rubber (Rubber particles) left in oven 1 | 0 | 0 |
| Pulverized rubber left in oven 21 | 0 | 0 |
| Oily materials produced in oven 1 (Recovered from cooler 26) | 250 | 5 |
| Oily materials produced in oven 21 (Recovered from cooler 28) | 2,240 | 45 |
| Carbonized materials obtained in oven 21 (Recovered from receptacle 25) | 1,640 | 33 |

EXAMPLE 4

In this Example, there was used a dry distilling apparatus comprising a fluidized bed-forming oven 31 wherein pulverization and pyrolysis of runbber material fed were substantially simultaneously effected while producing carbon powder by dry distilling said rubber material, the apparatus being such as shown in FIG. 3.

The oven 31 which was 300 mm in inner diameter and 1500 mm in length, was provided with a perforated tray 34 at the lower part thereof, a fluidizing gas inlet opening 35 at the further lower part thereof and an overflow conduit 37 at a part thereof 300 mm above the perforated tray 34, the conduit 37 serving to allow carbonized material produced by dry distillation to overflow therethrough. The oven 31 was provided further with a conduit 39 at the upper part thereof, which conduit served to allow oily materials produced by pyrolysis to pass therethrough together with a fluidizing gas and gases produced by the pyrolysis. The oily materials were passed through a cyclone 40 where carbonized materials entrained thereby were collected, to coolers 41 and 42 wherein they were condensed and recovered. A conduit connecting the oven 31 to the cooler 41 was maintained warm. The oven 31 was provided with an agitator 36.

The rubber material to be fed was prepared by cutting large-sized rubber tires into blocks having a size of (30–60) mm × (30–60) mm × (20–30) mm with a crusher having rotary cutting blades. The greater part of the bead wire contained in the rubber tires was separated by magnetic dressing in this crushing step. The rubber blocks were fed through a hopper 32 and screw feeder 33, and the agitator was operated at 10 r.p.m. to facilitate the fluidization of the rubber blocks so fed.

The rubber blocks weere fed at a feed rate of 40 Kg/hr, totalling 120 Kg. The operational temperature used was 450° C and this temperature was maintained by adjusting the feed rate of the rubber blocks. The air which was the fluidizing gas in this case, was introduced at a flow rate of 6 cm/sec (at room temperature). The perforated tray used was that which had a perforation size of 2 mm and a perforation ratio of 1.3%. During the operation of the oven, the agitator was stopped for 2–3 seconds at the initial stage of feeding the rubber blocks, after which a fluidized bed of the blocks was formed and the subsequent operation was performed smoothly and stably until the opertion was stopped. The oily materials and carbonized materials obtained by the dry distillation of the rubber blocks fed were 62 Kg and 42 Kg, respectively.

EXAMPLE 5

Experiments were made to determine the effects of agitation, thermal media (sand), and the properties and shape of rubber material to be subjected to fluidized bed dry distillation, on the formation of a fluidized bed comprising the rubber material and sand. In these experiments, as the rubber feed, there were employed used tires in an amorphous serrate divided form, used tires in a finely divided form or talc-covered unvulcanized rubber materials in a splinter form under the same dry distilling conditions as in Example 4 while setting the agitator in or out of operation and using or dispensing with sand as the thermal medium, in order to observe the thus-formed fluidized beds. Said rubber feeds were prepared as follows.

Used tires were crushed by a rotary crusher housing both rotary and fixed cutting blades to obtain amorphous serrate pieces thereof having a size of (200–20) mm × (200–20) mm × (100–30) mm. At this time, the greater part of the bead wire obtained was removed. The rubber pieces so produced were freed of those having a size greater than 70mm × 70mm × 4mm to obtain desired rubber pieces to be fed (these pieces being hereinafter referred to as "roughly divided tire sample").

Separately, used tires were crushed and sieved to obtain rubber particles having a size smaller than 2mm × 2mm × 2mm (these particles being hereinafter referred as "finely divided tire sample").

In addition, unvulcanized SBR rubber was cut into approximately uniform-sized pieces having an average size of 20mm × 20mm × 20mm, which pieces were then covered with talc powder to prevent them from adhering to each other (these pieces being hereinafter referred to as "unvulcanized rubber sample").

The Experiments were respectively made using the three kinds of rubber samples by effecting the dry distillation thereof in the same manner as in Example 4 while starting or stopping the operation of the agitator and using sand as the the thermal medium as indicated in Table 4 in order to visually investigate the state in which a fluidized bed was formed. The operational conditions used were as follows.

| | |
|---|---|
| Temperature in oven | 450° C |
| Fluidizing gas velocity in oven | 8 cm/sec |
| Fluidizing gas | Air |
| Agitation | 20 r.p.m. |
| Thermal medium | Sand, 1 Kg |

The results obtained from the Experiments are shown in Table 4.

Table 4

| Experiment No. | Rubber feed | Agitator | Sand | State of fluidization |
|---|---|---|---|---|
| 1 | Roughly divided tire sample | Operated | Not used | Stable fluidized bed was formed, and continuous operation was possible. |
| 2 | Finely divided tire sample | Operated | Not used | " |
| 3 (Control) | Roughly divided tire sample | Stopped | Used | Fluidized bed was not formed even 3 minutes after charge of about 2 Kg of rubber feed. Rubber blocks melt adhered to perforated tray. |
| 4 (Control) | Finely divided tire sample | Stopped | Not used | Fluidized bed was not formed. Rubber particles were melt adhered to each other to form blocks having non-uniform size. |
| 5 (Control) | Unvulcanized rubber sample | Operated | Not used | Rubber feed melt adhered to perforated tray thereby forming no fluidized bed. |

From the results mentioned above it is seen that agitation of crushed tire is necessary for a satisfactory pyrolysis of the crushed tire while forming a fluidized bed thereof in a fluidized bed-forming oven, that a fluidized bed of roughly divided rubber material is not formed without agitation even by the use of sand as the melt adhesion-preventing agent when the roughly divided rubber material is used as the rubber feed and that, unlike unvulcanized rubber feed, the use of used tire as the rubber feed permits formation of a fluidized bed of the used tire and a stable continuous operation of the oven.

EXAMPLE 6

Following the procedure of Example 4, but using 550° C as the pyrolyzing temperature and air at flow rate of 6 cm/sec as the fluidizing gas, the apparatus was continuously operated. The temperature in the fluidized bed-forming oven was maintained constant by adjusting the amount of rubber material fed during operation of the agitator at 10 r.p.m., after which the operation of the agitator was stopped. The temperature within the oven was unstable and gradually caused clogging of the perforated tray whereby the continuous operation of the oven could no longer be performed.

The variation in temperature during the operation of the oven is indicated in Table 5.

Table 5

| Duration of operation (min.) | Temperature within oven (° C) |
|---|---|
| Initial | 550 |

Table 5-continued

| Duration of operation (min.) | Temperature within oven (° C) |
|---|---|
| 20 | 550 |
| 40 | 550 |
| 60 | 550 |
| At this point, the agitator was stopped. | |
| 65 | 530 |
| 70 | 575 |
| 75 | 570 |
| 80 | 550 |
| 90 | 580 |
| 100 | 500 |
| 110 | 450 |
| The operation of the oven was stopped because of increase in pressure at the perforated tray clogged. | |

EXAMPLE 7

The procedure of Example 4 was repeated using varied temperatures, that is, 400°, 450°, 500° and 550° C as the pyrolyzing temperature. In each case, air was introduced at a flow rate of 6 cm/sec in the oven at room temperature. The oily materials so obtained in each case were subjected to fractionation, and the results are shown in Table 6.

Table 6

| Pyrolyzing temp. (° C) | $D_4^{20}$ | Fraction (%) Range of boiling point | | | | | | |
|---|---|---|---|---|---|---|---|---|
| | | −150° C | 150−200° C | 200−250° C | 250−300° C | 300−350° C | 350−400° C | 400° C − |
| 400 | 0.918 | 20.1 | 14.5 | 9.7 | 8.4 | 6.2 | 10.3 | 30.3 |
| 450 | 0.934 | 23.5 | 17.0 | 10.4 | 8.6 | 7.5 | 10.0 | 23.1 |
| 500 | 0.926 | 22.8 | 17.0 | 10.8 | 9.1 | 8.5 | 11.4 | 20.6 |
| 550 | 0.927 | 23.3 | 17.0 | 12.3 | 10.0 | 9.1 | 9.2 | 19.0 |

What is claimed is:

1. An autothermic process for the dry distillation of rubber in a fluidized bed-forming oven means comprising:
   1. heating, in an oxygen-containing fluidizing gas stream, rubber blocks under agitation by an agitation means, in the presence of carbon powder at temperatures which pulverize the said blocks into rubber particles, under these conditions, and
   2. continuing the heating of the thus-obtained rubber particles in an oxygen-containing fluidizing gas stream to temperatures which pyrolyze the said rubber particles thus fluidized, said carbon powder being produced in situ by the pyrolysis.

part of the rubber being burned throughout the process to produce in situ said heating in steps (1) and (2) required for the pulverization and pyrolysis respectively, thereby producing oily materials and solid materials, and then recovering the oily materials separately from the solid materials.

2. A process according to claim 1, wherein the oxygen-containing fluidizing gas stream for the pulverizing and pyrolyzing comprises an oxygen-containing fluidizing gas selected from the group consisting of air and inert gas-diluted air.

3. A process according to claim 1, wherein the rubber blocks are heated by externally supplied heat before said initial and further heating is effected only by the heat furnished by the burning of part of said rubber material.

4. A process according to claim 1, wherein said oven means comprises two ovens, said pulverization being effected in one oxygen-containing fluidized bed-forming oven, said pyrolysis of the rubber particles being effected in another oxygen-containing fluidized bed-forming oven.

5. A process according to claim 1, wherein the pulverization and pyrolysis are effected at temperatures of from 350° to 800° C.

6. A process according to claim 1, wherein the pulverization and pyrolysis are effected at temperatures of from 400° to 600° C.

7. A process according to claim 1, wherein said agitation means is provided at an inner lower part of the fluidized bed-forming oven means.

8. A process according to claim 1, wherein said oily materials are conducted from said oven means at a location disposed at an upper part of said oven means and said solid materials are conducted from said oven means at a location disposed at a lower elevation than said first said location.

9. A process according to claim 1, wherein said rubber blocks are used tire blocks.

10. A process according to claim 1, wherein said pulverizing temperatures are in the range of from 250° to less than 400° C and said pyrolyzing temperatures are in the range of from 400° to 500° C.

11. A process according to claim 1, wherein said pulverizing step is principally effected while the pyrolysis is simultaneously accessorily effected in one portion of said oven means, said pyrolyzing being principally effected while the pulverizing is simultaneously accessorily effected in another portion of said oven means.

12. A process according to claim 11, wherein said oven means comprises a single oven.

13. An autothermic process for the dry distillation of rubber in a fluidized bed-forming oven means comprising:
   1. initially heating, in an oxygen-containing fluidizing gas stream, rubber blocks under agitation by an agitation means, in the presence of melt-adhesion preventing solid particles at temperatures which pulverize the said blocks into rubber particles, under these conditions, and
   2. continuing the heating of the thus-obtained rubber particles in an oxygen-containing fluidizing gas stream to temperatures which pyrolyze the said rubber particles thus fluidized, part of the rubber being burned throughout the process to produce in situ said initial heating and said continuing heating required for the pulverization and pyrolysis respectively, thereby producing oily materials and solid materials, and then recovering the oily materials separately from the solid materials.

14. A process according to claim 13, wherein the solid particles are externally supplied ones selected from the group consisting of gravel, rubble, glass globules, powdered carbon, powdered iron, particulate carbonized rubber, particulate carbonized synthetic resins, powdered coke, powdered magnetite and powdered terra alba.

15. A process according to claim 13, wherein the rubber blocks are heated by externally supplied heat before said initial and said further heating is effected by the heat furnished by the burning of part of said rubber material.

16. A process according to claim 13, wherein said agitation means is provided at an inner lower part of the fluidized bed-forming oven means.

* * * * *